Figure 5:
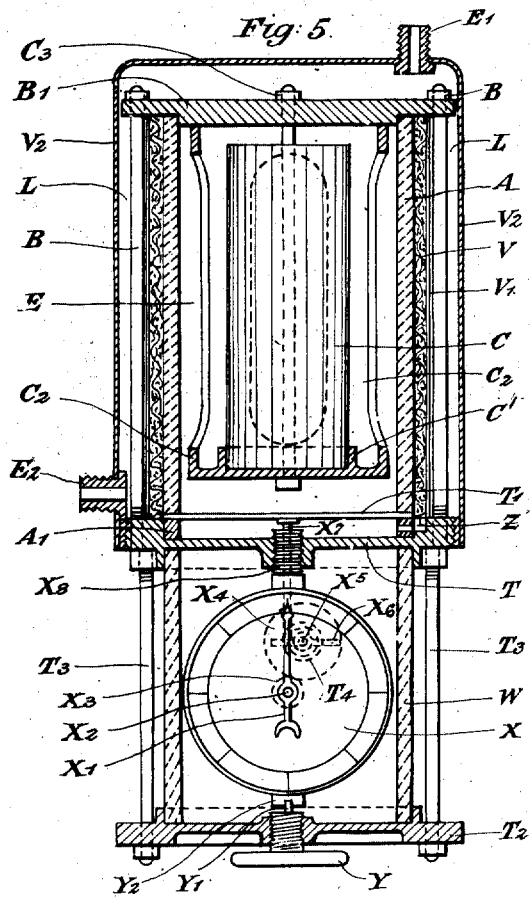

H. R. WEBSTER.
GAS TESTING APPARATUS.
APPLICATION FILED JUNE 29, 1917.
1,252,975.
Patented Jan. 8, 1918.
3 SHEETS—SHEET 1.
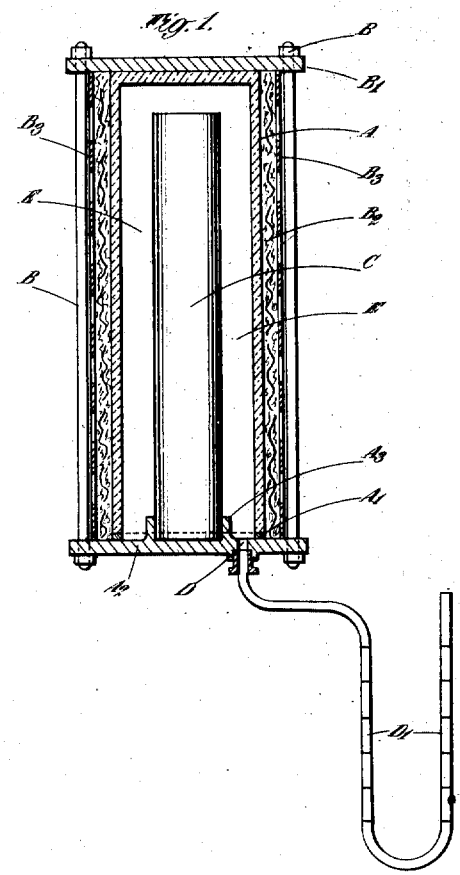
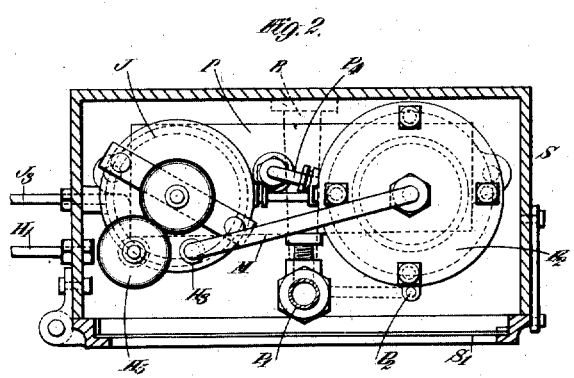
Inventor
Henry Roberts Webster
By
his Attorneys.

H. R. WEBSTER.
GAS TESTING APPARATUS.
APPLICATION FILED JUNE 29, 1917.
1,252,975.
Patented Jan. 8, 1918.
3 SHEETS—SHEET 2.
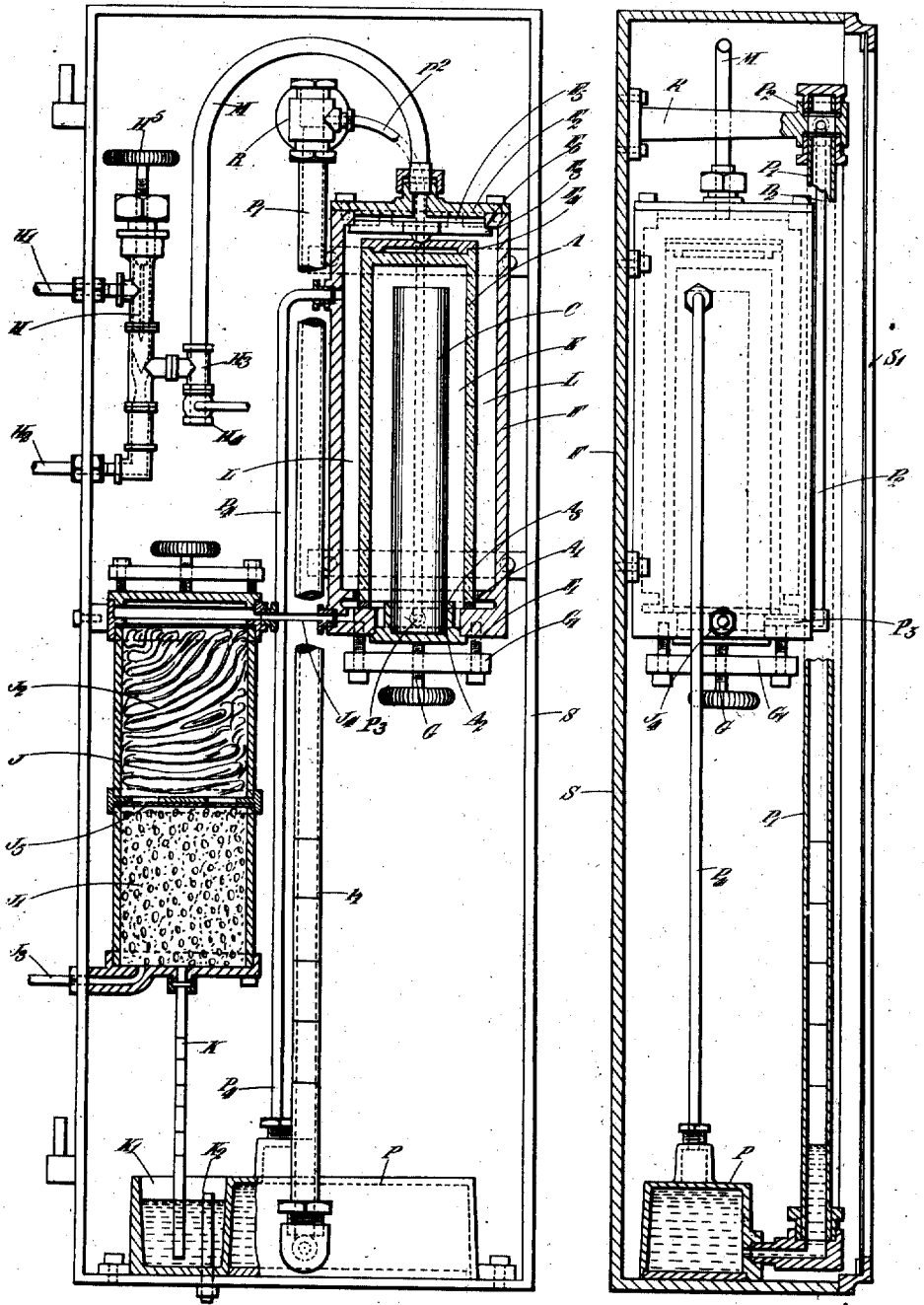

H. R. WEBSTER.
GAS TESTING APPARATUS.
APPLICATION FILED JUNE 29, 1917.

1,252,975.

Patented Jan. 8, 1918.
3 SHEETS—SHEET 3.

Inventor.
Henry Roberts Webster ated Jan. 8, 1918.

UNITED STATES PATENT OFFICE.

HENRY ROBERTS WEBSTER, OF HORSFORTH, NEAR LEEDS, ENGLAND.

GAS-TESTING APPARATUS.

1,252,975.

Specification of Letters Patent.

Patented Jan. 8, 1918.

Application filed June 29, 1917. Serial No. 177,715.

*To all whom it may concern:*

Be it known that I, HENRY ROBERTS WEBSTER, a subject of the King of Great Britain, residing at the Oaks, Scotland Lane, Horsforth, near Leeds, in the county of York, England, have invented certain new and useful Improvements in Gas-Testing Apparatus, and of which the following is a specification.

The object of this invention is to provide a gas-testing apparatus working on the diffusion principle for detecting and indicating the presence and proportion of an absorbable gas in a mixture with air or other gases, such for example as detecting and indicating the presence and proportion of carbon dioxid contained in the flue gases of boiler furnaces, recovery plants, and the like.

According to this invention the apparatus comprises in combination a closed vessel having a porous wall the exterior surface of which is to be exposed to the gases to be tested and through which porous wall diffusion of gases can take place, the said closed vessel containing a chemical absorbent of the gas to be detected, which absorbent may consist of caustic soda, caustic potash, soda lime or unslaked lime, which is preferably in a dry form, but may be in a liquid form. The interior of the porous vessel containing the chemical absorbent is in communication with means operable by the variations of pressure which occur in the interior of the porous vessel due to the absorption of the gas to be detected, to indicate the proportion of said absorbable gas; that is the interior of the porous vessel may be in communication with a flexible diaphragm, or a liquid diaphragm such as a U-tube containing mercury or water.

When such apparatus is placed so that the exterior of the porous wall of the vessel is in contact with a mixture of air and gases containing an absorbable gas such as carbon dioxid, these gases diffuse through the walls of the porous vessel, and upon reaching the interior the absorbable gas becomes absorbed by the chemical absorbent contained in the vessel, and thereby there is produced a decrease of pressure in the interior of the vessel which is indicated by the means provided for indicating variation of pressure, that is by alteration in the level of the liquid in the U-tube, or by alteration in the position of the diaphragm in proportion to the amount of gas absorbed by the chemical absorbent, and if the amount of absorbable gas surrounding the porous vessel be increased, there would be an equivalent reduction of pressure created in the absorbent vessel and a corresponding movement in the means provided for indicating the variations of pressure.

The porous vessel may be located within an air-tight casing of metal or other non-porous material and the gases are then drawn or forced through the casing so as to surround the porous vessel, and such gases could be conveyed to the apparatus by way of non-porous tubing, and while in transit thereto the said gases might be passed through a filtering process so as to remove free carbon, smoke and moisture.

If force or suction be used to pass the gases around the porous vessel, it is necessary that the other end of the U-tube or the other side of the diaphragm be subjected to the same force or suction, so that the reading is absolutely independent of the pressure or suction used for delivering the gases to the apparatus; and if desired, the U-tube or diaphragm may be fitted with a valve for the purpose of preventing sudden fluctuations.

In the case of non-absorbable but inflammable gas such as methane, the gas could be first burnt electrically or otherwise and the products of combustion, which contain an absorbable gas, on diffusing through the porous vessel would encounter the absorbent and give an indication of the proportion of such gas on the dial or U-tube.

Obviously the gases might be passed through the interior of a porous cylinder forming the interior wall of an outer non-porous airtight casing, the porous vessel containing the absorbent being comprised by the casing in conjunction with the porous cylinder.

Examples of construction of the invention are shown on the accompanying drawings, in which similar reference letters indicate like parts in all the figures, whereon:—

Figure 6:
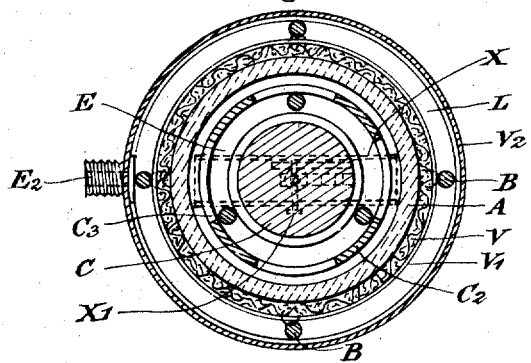

Figure 1 is a sectional elevation of a portable form of my diffusion apparatus, designed for use in cases where the apparatus itself is required to be introduced directly into the gases to be tested. Figs. 2, 3 and 4 are respectively a part sectional plan, a part sectional front elevation, and a part sectional side elevation of a stationary form of my diffusion apparatus, designed to take a continuous record of the proportion of carbon dioxid in the waste gases from a boiler furnace; and Figs. 5 and 6 are respectively a sectional elevation, and a sectional plan of a portable form of my diffusion apparatus, designed for use in cases where the gases to be tested are at some little distance from the apparatus itself.

Referring particularly to Fig. 1 of the drawings, A is a porous vessel of cylindrical form which is closed at the top and having its open bottom end made gas-tight by a packing ring $A^1$ with a bottom plate $A^2$ connected by bolts B to a top plate $B^1$. The bottom plate $A^2$ carries a cartridge C of chemical absorbent material which is held in a central position within the porous vessel A by a socket $A^3$ forming a part of the said bottom plate $A^1$, and the said porous vessel A is inclosed by a perforated metal casing $B^3$, the space between which latter and the porous vessel A is filled with a filtering material $B^2$, while a hole D formed in the bottom plate $A^2$ is fitted with a graduated U-tube $D^1$ communicating with the space E between the porous vessel A and the absorbent cartridge C.

The action is as follows:—On the above described apparatus being placed in the flow of the gases to be tested, the gas passing through the perforated metal casing $B^3$ and the filtering material $B^2$ comes into contact with the porous vessel A and diffusing through it reaches the chemical absorbent C which immediately absorbs the carbon dioxid contained in the gas, thus causing within the space E a partial vacuum the amount of which is shown by the height of the water in the graduated U-tube $D^1$.

Referring particularly to Figs. 2, 3 and 4 of the drawings, A is the porous vessel closed at the top and having its open bottom end made gas-tight by the packing ring $A^1$ with a flange $F^1$ of an outer metal casing F which surrounds the vessel A. C is the chemical absorbent cartridge which is held centrally within the porous vessel A by the socket $A^3$ in the bottom cover plate $A^2$, the latter being made gas-tight with the flange $F^1$ of the metal casing F and held in position by a hand-screw G passed through a removable crossbar $G^1$ so as to enable the cartridge C to be removed and replaced, while the porous vessel A is removably held in position by means of a disk plate $F^4$ through the medium of a four-armed crossbar $F^3$ carried in a top flange $F^2$ of the casing F, the said crossbar $F^3$ being put into position and removed by turning it around so that its arms pass through recesses $F^5$ formed in a fixed top flange $F^6$ of the casing F.

An injector H is provided having a steam inlet $H^1$ and an exhaust outlet $H^2$ and being provided with a suction branch $H^3$ communicating by means of a bent pipe M with a space L between the casing F and the porous vessel A, and $H^4$ is an air relief cock, while $H^5$ is a needle valve for regulating the steam supply to the said injector H. J is a gas filter having two compartments $J^1$ and $J^2$ and being provided with a gas inlet pipe $J^3$ and an outlet pipe $J^4$ communicating with the space L of the porous vessel A, the said compartments $J^1$, $J^2$ being filled with filtering material, preferably charcoal and wood wool respectively, separated by a perforated plate $J^5$, while the lower end of the filter J is provided with a graduated glass drip pipe K arranged to discharge into a tank $K^1$ fitted with an overflow pipe $K^2$. P is a closed water vessel communicating with the inside space E between the porous vessel A and the cartridge C through the medium of a graduated water-gage pipe $P^1$ and a small pipe $P^2$ connected with a hole $P^3$ formed in the bottom flange $F^1$ of the casing F, the tank P also being in communication with the space L between the porous vessel A and the outer casing F through a compensating pipe $P^4$.

The whole of the apparatus is inclosed in a metal case S to which the various parts are bolted or screwed, the parts $P^1$ and $P^2$ being held in position by a standard R, while the case itself is provided with a hinged glass front $S^1$.

The action is as follows:—On steam being admitted through the pipe $H^1$ to the injector H, a continuous circulation of gas is set up; that is to say, the gas (after passing through a filter situated between the boiler flue and the recording apparatus) is caused to enter the filter compartments $J^1$, $J^2$ by way of the inlet pipe $J^3$ and pass on through the small pipe $J^4$ into the space L between the outer casing F and the porous vessel A, in which space it circulates and leaving it by way of the pipe M is discharged by the injector H through the outlet pipe $H^2$. In its passage through the space L the gas comes into contact with the porous vessel A; diffuses through it and enters the space E where the carbon dioxid contained in the gas is immediately absorbed by the chemical absorbent C, thus causing in the space E a partial vacuum the amount of which is shown by the height of the water column in the gage pipe $P^1$.

In order to maintain an equality of suction or balance of pressure between the tank P and the gases circulating through the system in the space L and the pipe M irrespective of variation in the speed of the current caused by the injector H, communication is established between the tank P and the space L by the compensating pipe $P^4$ so that the height of the water column in the pipe $P^1$ remains unaffected by any difference in the suction caused by variations in the flow of the gas. In order to prevent excessive speed of the current of gas, provision is made for the injector H to draw a certain quantity of air with the gas at the suction inlet $H^3$ by way of a regulating cock $H^4$; while the pipe K, being of glass and graduated, serves to indicate the amount of suction in the filter J caused by the injector H.

Referring particularly to Figs. 5 and 6 of the drawings, A is the porous vessel which is open top and bottom and is made gas-tight at the bottom by means of a ring $A^1$ and at the top to the plate $B^1$, the parts being drawn together by bolts B connecting a middle plate T with the top plate $B^1$, while a thin elastic diaphragm $T^1$ is held across the bottom of the vessel A by the ring $A^1$. C is the chemical absorbent cartridge fixed in a socket $C^1$ of an open cage $C^2$ which is hung from the top plate $B^1$ by bolts $C^3$. Filtering material V such as cotton wool is packed around the outer circumference of the porous vessel A and held in position by wire gauze $V^1$, and the whole is inclosed by a sheet metal case $V^2$ so as to leave between it and the wire gauze $V^1$ the space L in which the gases may circulate. The case $V^2$ has a gas inlet connection $E^1$ and an outlet connection $E^2$, while W is a glass cylinder made gas-tight to the middle plate T and also to a bottom plate $T^2$ by bolts $T^3$ which hold the said plates together. X is an indicating dial having a pointer $X^1$ carried on an axle $X^2$ on which is fixed a pinion $X^3$ geared with a toothed wheel $X^4$ carried on an axle $X^5$ on which is fixed a small balance lever $X^6$, and on one end of the said lever $X^6$ rests a loose pin $X^7$ which passes through an adjusting screw $X^8$ of the dial X and is connected to the elastic diaphragm $T^1$, while a slight pressure against the diaphragm $T^1$ is maintained by a spiral spring $T^4$ acting on the pin $X^7$. Y is an adjusting hand-wheel and screw having a chisel end $Y^1$ fitting into a boss $Y^2$ of the dial X, so that the latter may be adjusted vertically without taking the instrument apart by merely turning the said adjusting hand-wheel Y and consequently raising or lowering it through the top adjusting screw $X^8$. Z is a small hole connecting the underside of the diaphragm $T^1$ with the space L by way of the cotton wool packing V.

The action is as follows:—The gas to be tested is either drawn or pumped through pipes connected with the inlet branch $E^1$ and the outlet $E^2$ so as to circulate in the space L, and after filtering through the cotton wool V comes into contact with the porous vessel A through which it diffuses and enters the space E where it meets the chemical absorbent C which immediately absorbs the carbon dioxid contained in the gas and thus creates a partial vacuum inside the porous vessel A. This vacuum raises the elastic diaphragm $T^1$ at the center and with it the pin $X^7$, thus rotating the wheel $X^4$ and pinion $X^3$ so as to multiply the motion which is transferred through the axle $X^2$ to the pointer $X^1$.

What I claim as my invention and desire to secure by Letters Patent is:—

1. An apparatus for detecting and indicating the presence and proportion of absorbable gas included in a mixture with air or other gases; comprising in combination a closed vessel having a porous wall the exterior surface of which is to be exposed to the gases to be tested and through which porous wall diffusion of gases can take place, a chemical absorbent of the gas to be detected located in said closed vessel, and means operable by the variations of pressure in said vessel due to the absorption of the gas to be detected, to indicate the proportion of said absorbable gas.

2. An apparatus for detecting and indicating the presence and proportion of absorbable gas included in a mixture with air or other gases; comprising in combination a closed vessel having a porous wall the exterior surface of which is to be exposed to the gases to be tested and through which porous wall diffusion of gases can take place, a body of dry chemical material which is absorbent of the gas to be detected located in said closed vessel, means for holding said chemical body about centrally within said porous vessel, and a graduated U-tube one arm of said tube communicating with the interior of said closed vessel the opposite arm being open to the external atmosphere and a liquid in said U-tube the level of which varies according to the variations of pressure in said closed vessel, to indicate the proportion of absorbable gas.

3. An apparatus for detecting and indicating the presence and proportion of absorbable gas included in a mixture with air or other gases, comprising in combination a closed vessel having a porous wall through which diffusion of gases can take place, a casing impermeable to gases inclosing said vessel and having a space between said casing and said vessel, an inlet tube in the wall of said casing communicating with said space in the interior of said casing constituted between said casing and the external wall of said closed vessel to introduce the gases to be tested, an exit tube in the wall of said casing communicating with said space to permit of the exit of the gases therefrom, a chemical absorbent of the gas to be detected located in said closed vessel, and means operable by the variations of pressure in said vessel due to the absorption of the gas to be detected, to indicate the proportion of said absorbable gas.

4. An apparatus for detecting and indicating the presence and proportion of absorbable gas included in a mixture with air or other gases; comprising in combination a closed vessel having a porous wall to the exterior surface of which the gases to be tested have access and through which porous wall diffusion of gases can take place, a protective and insulating external covering of material permeable to the gases surrounding the porous wall of said closed vessel, a chemical absorbent of the gas to be detected located in said closed vessel, and means operable by the variations of pressure in said vessel due to the absorption of the gas to be detected, to indicate the proportion of said absorbable gas.

5. An apparatus for detecting and indicating the presence and proportion of absorbable gas included in a mixture with air or other gases; comprising in combination a closed vessel having a porous wall through which diffusion of gases can take place, a casing impermeable to gases inclosing said vessel and having a space between said casing and said vessel, an inlet tube in the wall of said casing communicating between the supply of gases to be tested and the space in the interior of said casing constituted between said casing and the external wall of said closed vessel, an exit tube in the wall of said casing communicating with said space, a suction device with which said exit tube communicates to produce a current of the gases to be tested through said space to which the exterior of said porous wall of said closed vessel is exposed, a chemical absorbent of the gas to be detected located in said closed vessel, and means operable by the variations of pressure in said vessel due to the absorption of the gases to be detected, to indicate the proportion of said absorbable gas.

6. An apparatus for detecting and indicating the presence and proportion of absorbable gas included in a mixture with air or other gases; comprising in combination a closed vessel having a porous wall through which diffusion of gases can take place, a casing impermeable to gases inclosing said vessel, an inlet tube in the wall of said casing communicating between the supply of gases to be tested and the space in the interior of said casing constituted between said casing and the external wall of said closed vessel, an exit tube in the wall of said casing communicating with said space, a suction device with which said exit tube communicates to produce a current of the gases to be tested through said space to which the exterior of said porous wall of said closed vessel is exposed, a chemical absorbent of the gas to be detected located in said closed vessel, and a graduated U-tube one arm of said tube communicating with the interior of said closed vessel and the opposite arm communicating with the space between said casing and the external wall of said closed vessel and a liquid in said U-tube the level of which varies according to the variations of pressure in said closed vessel, to indicate the proportion of absorbable gas.

In witness whereof I have hereunto set my hand in the presence of two witnesses.

HENRY ROBERTS WEBSTER

Witnesses:
    JOHN JOWETT,
    CYRIL BELLAMY.